UNITED STATES PATENT OFFICE.

ALEXANDER EHRENBERG, OF DARMSTADT, GERMANY, ASSIGNOR TO THE FIRM OF E. MERCK, OF SAME PLACE.

PROCESS OF MAKING ALKYL ETHERS OF MORPHIN.

SPECIFICATION forming part of Letters Patent No. 629,433, dated July 25, 1899.

Application filed December 7, 1898. Serial No. 698,568. (No specimens.)

*To all whom it may concern:*

Be it known that I, ALEXANDER EHRENBERG, residing at Darmstadt, Germany, have invented certain new and useful Improvements in Processes of Preparing Alkyl Ethers of Morphin, of which the following is a full, clear, and exact description.

My invention relates to an improved process for preparing alkyl ethers of morphin; and my object is to provide a more economical method of preparing the same.

The methods heretofore known for preparing alkyl ethers of morphin—for instance, methyl ether (codein) or ethyl ether (codethylin)—have the drawback of furnishing a relatively small yield of the desired products. In treating morphin with methyl iodid or ethyl iodid there is such a small yield of the respective morphin ethers that the method may be considered as being without any industrial significance or commercial value, and even when sodium methyl sulfate or sodium ethyl sulfate is used for the above-named purpose the same drawback is again found, in that a large part of the morphin present escapes the intended reaction and that this part in order to be partly utilized must first be regained by a repetition of the operation, which procedure cannot be carried on without a certain loss of substance. These drawbacks I avoid by employing neutral inorganic-oxygen-acid-esters of those alkyls desired to be combined with the morphin as reagents in the preparation of ethers of morphin. The preferred method consists in adding to an alcoholic solution of morphin a trifle more than the calculated amount of alkali or alkaline earth (in the form of hydrate or alcoholate) and then adding a neutral inorganic-oxygen-acid-ester of the desired alkyl, likewise in quantity slightly exceeding one molecule. The reaction commences at ordinary temperatures, but is accelerated and completed by warming on a water-bath.

The isolation of codein, as well as of small amounts of morphin which may have escaped the reaction, may be brought about according to any of the well-known methods. An actual example of the manufacture is as follows: One kilo of morphin, eighty-five grams of metallic sodium, four hundred and twenty grams of methyl sulfate, and six thousand cubic centimeters of alcohol are heated on a water-bath for some hours, whereupon the codein formed is isolated according to any well-known method.

What I claim as my invention is—

1. The process of preparing alkyl ethers of morphin which consists in acting, by a neutral inorganic-oxygen-acid-ester of an alkyl, upon an alkaline solution of morphin.

2. The process of preparing an alkyl ether of morphin which consists in acting by a neutral ester, derived from a sulfuric acid with an alkyl, upon an alkaline solution of morphin.

3. The process of preparing an alkyl ether of morphin which consists in acting by methyl sulfate upon a solution of morphin in which the replaceable hydroxyl-hydrogen has been replaced by a metal whose hydroxid possesses alkaline reaction.

4. The process of preparing an alkyl ether of morphin which consists in dissolving an alkali in an alcoholic solution of morphin and then acting on the mixture with a neutral sulfuric-acid-ester of an alkyl.

Signed at Mainz, Germany, this 3d day of August, 1898.

ALEXANDER EHRENBERG.

Witnesses:
   C. E. MERCK,
   WALTER HAUSIUS.